United States Patent
Bushner et al.

(10) Patent No.: US 6,462,671 B2
(45) Date of Patent: *Oct. 8, 2002

(54) REMOTE SECURITIES BASED DATA RECEPTION AND ORDER SYSTEM

(76) Inventors: Brendyl Trent Bushner, 5586 County Road 48, Yuma, CO (US) 80759; Fredrick William Bushner, II, 51163 Colorado Road C, Yuma, CO (US) 80759

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,859

(22) Filed: Oct. 20, 1998

(65) Prior Publication Data

US 2001/0040511 A1 Nov. 15, 2001

(51) Int. Cl.[7] .............................................. H04L 12/28
(52) U.S. Cl. ............................ 340/825.27; 340/7.21; 370/310; 370/394; 370/313
(58) Field of Search ........................ 340/825.27, 825.44, 340/7.21; 370/310, 394, 400, 313

(56) References Cited

U.S. PATENT DOCUMENTS

| | | |
|---|---|---|
| 4,473,824 A | 9/1984 | Claytor |
| 4,674,044 A | 6/1987 | Kalmus et al. |
| 5,045,848 A | 9/1991 | Fascenda |
| 5,173,688 A | 12/1992 | DeLuca et al. |
| 5,270,922 A | 12/1993 | Higgens |
| 5,398,021 A | 3/1995 | Moore |
| 5,426,422 A | 6/1995 | Vanden Heuvel et al. |
| 5,504,802 A | 4/1996 | Kennedy et al. |
| 5,625,363 A | 4/1997 | Spilker |
| 5,628,050 A | 5/1997 | McGraw et al. |
| 5,661,652 A * | 8/1997 | Sprague et al. .......... 364/449.7 |
| 5,668,556 A | 9/1997 | Rouffet et al. |
| 5,724,644 A * | 3/1998 | Wassink et al. ............ 340/7.51 |
| 5,734,867 A | 3/1998 | Clanton et al. |
| 6,157,621 A * | 12/2000 | Brown et al. ................ 370/310 |

OTHER PUBLICATIONS

US 5,832,252, 11/1998, Kikinis (withdrawn)*
Newton's Telecom Dictionary, Harry Newton, 1999, p. 352.*

* cited by examiner

*Primary Examiner*—Brian Zimmerman
*Assistant Examiner*—Yves DaLencourt
(74) *Attorney, Agent, or Firm*—Lee G. Meyer; Meyer & Associates, P.C.

(57) ABSTRACT

An interlink system for conveying security quotations and other related data to remote locations by means of satellite down link and preferably providing a satellite up link for remote users to place authenticated orders for securities. The satellite uplink/downlink is preferably by synchronous satellite. The hand held portable receiver/transmitter for receiving a plurality of said quotations and broadcasting data representing each of said orders with appropriate encrypting has storage capacity individually storing the received data representing each of said quotations. A display on the handheld unit coupled to the storage allows the user to display individually selecting data representing any one of the received quotations. The device can also store and transmit an encrypted, authenticated order to transact securities by means of the handheld unit.

17 Claims, 3 Drawing Sheets

REMOTE SECURITIES BASED DATA RECEPTION AND ORDER SYSTEM

BACKGROUND OF THE INVENTION

1. Field of the Invention

The present invention relates to a device and method for remotely receiving securities based information and placing transaction orders for securities; and, more particularly to a device and method for receiving securities based data and placing transaction orders for securities in remote locations by use of a portable unit which communicates directly with an information center and/or brokerage house by means of a satellite up/link-down/link.

2. Related Art

Transceiver units, which allow wireless communication, have become very popular for sending and receiving data in remote and non-stationary locations such as in a car, plane or the like. These units are primarily voice links but can also handle data by way of a modem. There are some inherent limitations to these devices and they act primarily as data links to existing interlinked sources of information such as those available by logging on the Internet.

Business professionals, including farmers and ranchers, currently receive securities based information such as stock and commodity data as well as information about weather, market forecasting, world and national events, etc., in a variety of ways. These include radio, television, Internet and fixed satellite broadcasts among others. This information, although accurate, may not be timely. This is especially true if the information is desired in a remote location or while traveling.

In many cases, such as in the commodities market, farmers and ranchers require up to the minute quotes and a means for buying and selling futures almost instantaneously. Although timely information may be available in a hard link or stationary facility through for example, Internet services, transponder broadcasts and the like, it is necessary to have concurrent remote access without the necessity of logging on or being in a "cell." Additionally, ability to remotely respond to market prices and conditions by transacting securities trading remotely is a necessity in our fast paced life. Since one cannot know ones exact remote whereabouts with regard to securities data transmission or brokerage establishments, a remote system has to be fully transportable yet have access to "on line" data transceiving links even in the remotest locations. Since one can not continually monitor any device, a portable unit for remote use must have instantaneous, remote on line up/link and down/link access while having a capability to store securities data.

Securities information including price quotations generally consist of an alphanumeric code of up to eight characters which define uniquely the security, including if appropriate, information such as the exchange upon which it is traded and its date of issue or maturity, volume, last trade, bid-ask and the like. This code is easily recognized by those in the financial community. The symbol of a publicly traded stock used by an exchange consist of no more than 8 characters. For example, the stock of the telecommunications company U.S. West is represented by USW/N, and the stock of the suitcase manufacturer Samsonite is represented by SAMC/O.

The price of a stock is represented by no more than 7 characters. The characters are comprised of an integer up to 400 followed by a fractional number chosen from the group of ⅛, ¼, ⅜, ½, ⅝, ¾, and ⅞. The information system uses a 12 bit code, which can represent up to 8 characters, to send and receive data. Thus, the 12 bit code is sufficient to represent a stock's trading symbol and trading price. Where a source, such as a trader or a broker, wishes to transmit the current price of a stock, he would transmit the stock's symbol followed by trading price. For example, to transmit that Samsonite was trading at 17 and ⅜, the broker would transmit the sequence SAMC/O (173/8).

Other symbols represent information well known to those in the financial community such as "BSTBD," "BSTAK," "MAXSL," "MAXBY," etc. "BSTBD" represents the best bid price for a stock that a market maker is willing to pay. "BSTAK" represents the best asking price for a stock at which the market maker is willing to sell the stock. "MAXSL" is the maximum number of shares of a stock a market maker is willing to sell, and "MAXBY" is the maximum number of shares of a stock a market maker is willing to buy. To indicate the best bid price of a stock, the broker would transmit the "BSTBD" symbol with the stock symbol and price. For example to transmit the information that the best bid price of U.S. West is $37.00 per share, the broker would send the following sequence: BSTBD (USW/N, 37.00). This format is used to transmit a variety of information and can be revised at any time by the system operator.

Alternative formats have the stock's symbol as the field indicator followed by the information type indicator and its value. For example, the best bid price of U.S. West at $37.00 per share can be indicated by USW/N (BSTBD, 37.00).

Symbols used to indicate buy or sell orders also consist of no more than 8 characters. For example, a buy request consists of the "BUY" symbol followed by the stock to be purchased, the number of shares, its buying price, and the user identification number. The user identification number is a unique assigned identifier (PIN) that verifies the identity of the user. Thus, a user with identification number 12345 would transmit a buy request to purchase 100 shares of U.S. West at $37.00 per share by transmitting the sequence: BUY (USW/N, 100, 37.00, 12345). A "sell" request consist of the "SELL" symbol followed by the stock to be sold, its selling price, and the user identification number. A user with identification number 67891 would transmit a sell request to sell 200 shares of Samsonite at $17.32 a share by transmitting the sequence: SELL (SAMC/O, 200, 17.32, 67891).

Other information such as price/earnings ratios, dividends, exchange averages, advance-decline indicators, and the like are necessary to be transmitted and received by a remote information/ordering system. Further, it would be advantageous to have means for setting warning codes in a remote system, such that the system on standby would emit a signal to alert the user upon receiving triggering information.

Such a system would use satellite technology to provide the necessary information in a timely and efficient manner. Satellite communications with mobile terminals investigated up to the present use two types of orbit, namely geostationary satellite orbits and strongly inclined elliptical orbits. The Global Positioning System (GPS) satellite constellation utilizes four equally spaced satellites in each of six orbit planes. Since the satellites are spaced at 90° increments, one satellite is always 180° on the other side of the earth and hence shadowed by the earth. This geosynchronous constellation provides complete coverage of the earth at all times. One aspect of the GPS satellite system is the Nudet Detection System (NDS) communications link (L3) aboard GPS satellites. The L3 link operates at a frequency of 1381.05 MHZ, and can transmit approximately 2400 messages per day, each containing up to 100 characters, between one satellite and one transceiver. This avenue of transmission has only recently been explored, but it utilizes an untapped resource on the satellites to down/link and up/link information. The terminals in any case use "satellite hop" to provide a connection between the up/link terminal and down/link terminal. This ability to provide information from one satellite to another, coupled with the complete coverage obtained by the GPS satellites make the technology ideal for the transmission of information instantaneously over vast distances.

U.S. Pat. No. 4,473,824, shows a transmitter for receiving and broadcasting quotations and a remote portable receiving unit for updated price quotations which has a display screen. U.S. Pat. Nos. 5,625,363, 5,628,050 and 5,734,867 disclose hand held receiver's with direct uplink to a satellite. U.S. Pat. No. 5,173,688 shows a hand-held receiver with an up datable system with display screen. U.S. Pat. No. 5,398,021 discloses a hand held receiving unit capable of receiving updates for things such as sports, stock and weather data. U.S. Pat. No. 3,387,268 discloses a "tape watcher apparatus". U.S. Pat. No. 2,611,924, discloses a device without local memory at the receiving unit. U.S. Pat. No. 3,716,835 relates to a personal stock quotation system terminal provided with a cradle for a telephone handset and control signals for obtaining the stock information from a central computer and display means for displaying the stock information obtained from the central data processing system.

SUMMARY OF THE INVENTION

The present invention is a device and method for receiving, sending storing and retrieving securities based information in remote locations by use of a portable unit which communicates directly with an information center and/or brokerage house by means of a satellite up/link-down/link. The invention comprises portable apparatus for receiving transmitted quotations, storing them in memory and subsequently recalling them from memory and displaying them on command; and, transmitting encrypted authenticated orders for security transactions, wherein both said reception and transmission is by means of satellite up/link and down/link.

The invention consists essentially of three interactive, but distinct, components which cooperate to allow the user unfettered mobility while receiving securities information and data, and transmitting encrypted buy and sell orders to for example, customers, private parties, principles, brokers, regional and national exchanges and over the counter markets. In accordance with the invention, a portable transceiver means, capable of receiving securities information and transmitting buy and sell requests communicates with an information system which organizes the information into a compact and secure format, and an interactive communications system which continuously links the portable transceiver means to a ground station to transfer securities information and encrypted buy and sell requests between the ground station and the portable transceiver means by way of the information system. The interactive communications system comprises a satellite communication system. As used herein satellite system means a system capable of communications up/link-down/link without "dead spots" or loss of signal over a wide area. In one embodiment the receiver is vehicle mounted. In a preferred embodiment, mobile receiver is small enough to be carried in for example, a pocket or the like i.e. hand held. In a preferred embodiment, a remote data based system for retrieving and storing the current bid and asked prices on exchange and/or OTC markets is provided. In a further embodiment, the receiver contains coded alarm means which can be set for triggering upon the happening of coded received events.

In a preferred embodiment, the system is capable of transmitting qualified customer buy/sell orders for execution. In a preferred embodiment, commodity information is received. In another embodiment the receiver contains function keys which can be programed to perform specified functions. The information system is used to represent information useful to the financial community such as the name of a stock, futures, derivative or the like, along with an associated price in a compact digital format suitable for radio transmission. This information is processed using digital data processing equipment well known by those skilled in the art. Along with financial information such as a stock's name and price, the information system is also capable of representing necessary buy and sell information such as a customer identification number, buy price or sell price, the number of shares to buy or sell, best bid price, best asked price, and the like. Warning codes are included to warn the user of the occurrence of preset conditions in the market. Information transmitted from the transceiver is secured by encryption and authentication.

Other advantages of this invention will be apparent from the following specification, claims and drawings.

DESCRIPTION OF PREFERRED EMBODIMENTS

Figure 1:
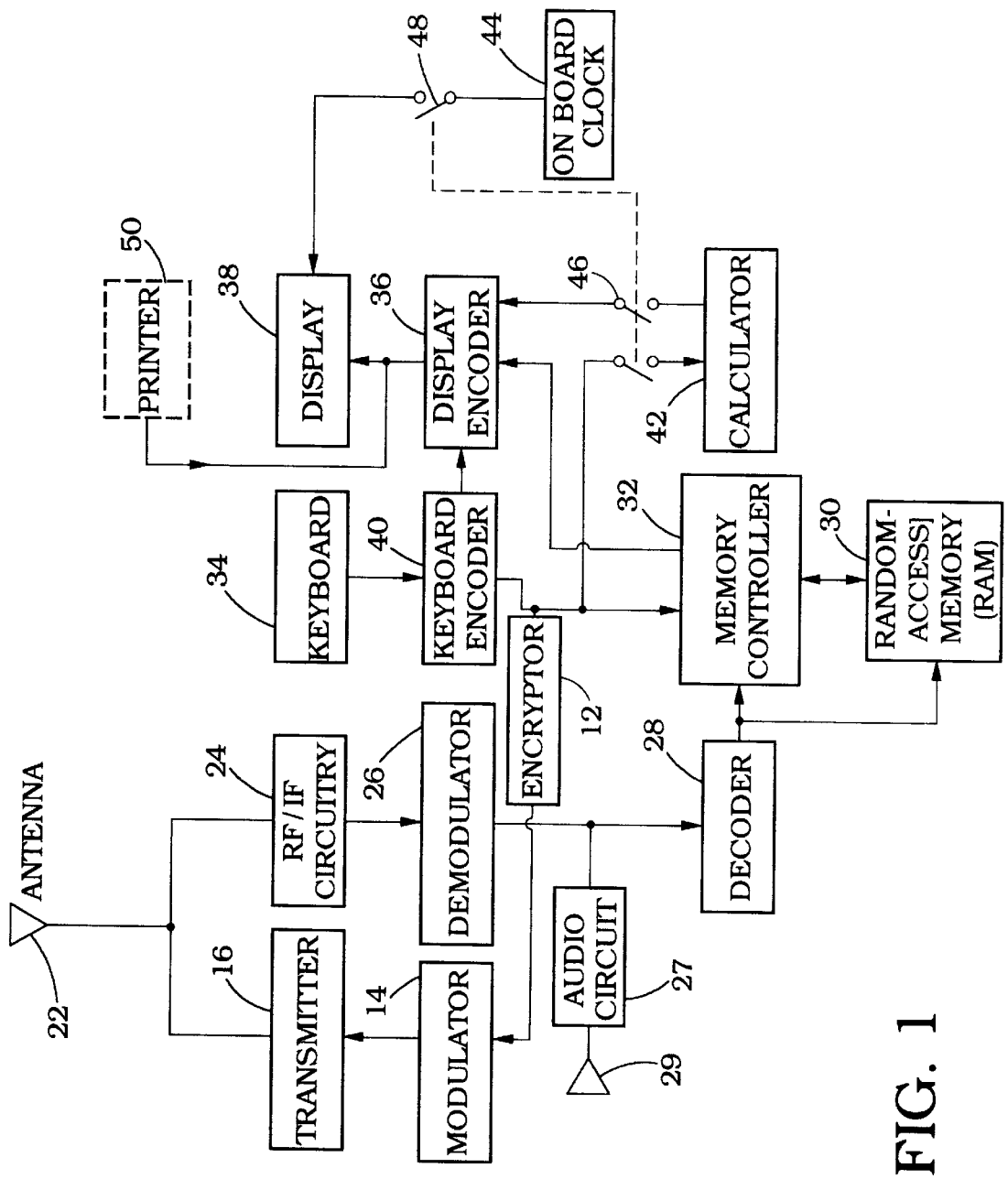
FIG. 1 is a component block diagram of the transceiver of the instant invention.

The transceiver is preferably a handheld unit which fits into a shirt pocket with electronic memory capable of storing received data. Data is transmitted and received by the transceiver through standard RF modulation and demodulation techniques such as FM (frequency modulation), AM (amplitude modulation), SSB (single side-band), FSK (frequency shift keying), PSK (phase shift keying), PCM (pulse code modulation), and the like. The transceiver has a keypad by which to enter data and an alphanumeric display such as a liquid crystal display by which to display data. The transceiver is normally in a powered-down mode whereby the transceiver receives data and stores it into memory to be accessed at a later time. Upon the reception of user specified data, the transceiver generates an alarm to alert the user to the reception of such data. The transceiver preferably receives and transmits at a high frequency so that the handheld unit may function in buildings, tunnels, under bridges and the like and the required antenna is omnidirectional, compact and portable.

The satellite component is preferably a constellation of satellites which provides complete communication coverage of the Earth's surface so that a user can receive and transmit financial information from any place on the globe. A preferred embodiment is the GPS navigational system currently in the Earth's orbit wherein the information would be transmitted on the Nudet Detection System communications link L3.

The following description of a preferred embodiment can be adapted to be used in any type of securities trading and information system. To simplify the presentation of the preferred embodiment, stocks will be chosen as the security to be traded. It will be noted that the following description is for illustrative purposes and with suitable modifications well known by those skilled in the art, any type of security can be traded over a variety of satellites, with the following described embodiment.

The preferred embodiment is most easily understood by first describing the information system. The information system converts information into a 12 bit code before transmission to the handheld transceiver. Where the information is to be transmitted from the handheld transceiver, the transmission must be accompanied by a customer identification number which is verified before a transaction can take place. To protect the privacy of a transmission sent from a handheld transceiver, the transmission is encrypted prior to broadcast. The information system also includes power codes so that the transceiver can be switched between passive and active mode upon receiving the appropriate symbol.

The transceiver is a simple and rugged unit similar in size and construction to the currently available handheld GPS units. The circuitry of the transceiver is designed to be compact and energy efficient. Thus, the transceiver is easily portable and capable of being used for extended periods of time without recharging or battery replacement. One of the keys to the transceiver's efficiency is its memory. While the exact nature of the memory is unimportant, various types of semiconductor memory are contemplated. For example, dynamic or static RAM such as Mostek MK-4116, Mostek MK-4164 or bubble memory such as Texas Instruments TIB0203. The primary purpose of the memory is to allow the transceiver to passively receive, store and update information while the transceiver is in a passive or standby mode which consumes very little power. When the user chooses to view stock information, he switches the receiver from the standby mode to active mode which activates the viewing screen and keyboard. The transceiver can also be switched between active and passive mode by reception of the appropriate code.

When storing a stock's price into the memory, the stock's symbol is used as the address for the information. Whenever a stock's trading price changes, the new value is transmitted over the system. If there is no previous value stored for that stock in a transceiver's memory, the transceiver creates a new location in the memory for that stock price. Where there is a previous value for that stock's price, the transceiver will overwrite the old value with the new value. Thus, the stock's price is updated as frequently as necessary to keep the pricing information current. When a stock's price is changing frequently, the memory is simply overwritten each time a new price for the stock is transmitted. Although the transceiver is contemplated as having enough memory to accommodate any desired number of stock prices, if the memory is full when an as yet unstored stock's price is received, the stock with the oldest price is replaced with the more recent stock's price. Thus, when memory space is needed, the most inactive stock is deleted.

Referring to FIG. 1 a signal received by the transceiver through the antenna 22 and RF circuitry 24 is first demodulated 26 to produce the sequential 12 bit code. The 12 bit code is then decoded 28 and that information stored in the RAM 30 at a location selected by the memory controller 32. When the transceiver is switched to active mode and the appropriate commands entered at the keyboard 34 and encoded at the keyboard encoder 40, the memory controller sends the accessed information in the memory to the display encoder 36. After the accessed memory contents are decoded, the information is displayed to the user at the display 38. Alternatively, the information can be printed out on a printer 50. Since stock prices are public information, there is no need for encryption or decryption. Circuits to demodulate, decode, control memory, and keyboards which will work well in the transceiver are well known in the art. Signals intended for a specific transceiver are accompanied by the user identification number, and other transceivers which do not recognize the number ignore the signal, since it cannot be decrypted.

The transceiver is equipped with an audio circuit 27 which recognizes any warning signals which maybe received by the transceiver. Such warning signals cause the audio circuit 27 to emit an audible warning tone through the speaker 29. Warning levels can be preset by the user to indicate a variety of conditions in the market such as certain price points being reached by a particular stock, certain levels of activity in any particular exchange, inaccurate data transmissions, and the like.

Still referring to FIG. 1, a buy or sell request is transmitted by the user first entering the information at the key board 34 and it is then encoded and encrypted 12. After encryption, the information is modulated at the modulator 14 and then transmitted 16 through the antenna 22.

The transceiver does not acknowledge reception of signals so a synchronous signal is used. Thus, the transceiver has an on-board clock 44, activated by switch 48, which can also display the time of day. The transceiver also has a calculator 42 which can be operated through the keyboard 34 and display 38.

Figure 2:
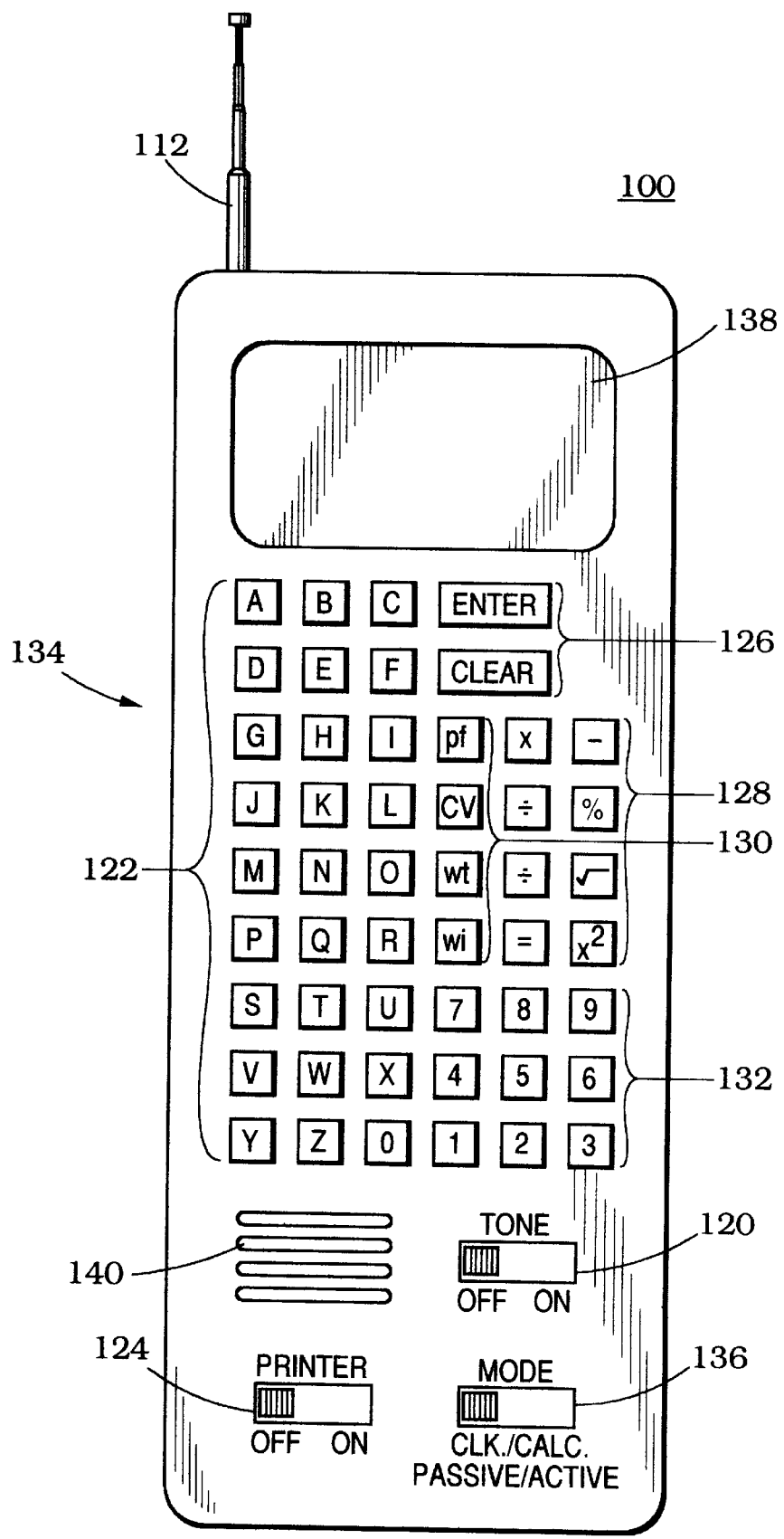
FIG. 2 is a front view of a hand-held transceiver of the instant invention.

FIG. 2, illustrates the keyboard 134 of the receiver 100 and includes alphabetical keys 122, numerical keys 132, mathematical function keys 128, special designator keys 130, and enter and clear keys 126. The antenna 112 is for communicating with the satellite system.

The alphabetical keys 122 are used to select the name of the stock or security in question. When mode switch 136 is in the quotation mode causes the display 138 to produce the selected stock or security name on display 138. The circuitry then accesses RAM 30 at that particular selected location and retrieves the current price of the security, for example 58 ⅛, as shown on the display 138. If it is desired that this information be printed then printer switch 124 can be placed in the on position and the name of the selected security printed along with its current price. Thus, it is seen that the price of any desired security may be retrieved by the entering through the keyboard 134 the designation by which the security is known.

The numerical keys 132 may be used not only in conjunction with designating a particular stock or security whose price is to be reviewed, but may also be used for calculations when mode switch 136 is in the calculator mode or for entering changes in the time-of-day clock when the mode switch 136 is in the clock mode. The mode switch 136 also provides for the selection between passive mode or active mode.

When the mode switch 136 is in the calculator mode, one not only uses the numerical keys 132 but also utilizes the function keys 128 in order to perform the necessary calculations.

Specialty designator keys 130 are used to designate preferred stock, convertible debentures, warrants, or a "when issued" security. The selection of any one of these particular keys in conjunction with a desired stock will allow a distinction to be made, for example, between the special stocks and common stock.

The enter and clear keys 126 are used in an obvious manner to clear the data on the display, to enter selected data such as the name of a particular security whose prices is to be reviewed or the time-of-day change when the mode switch 136 is in the clock mode. Also, tone switch 120 can be turned on or off so that the speaker, which is located under slots 140, may be active or inactive as desired.

Figure 3:
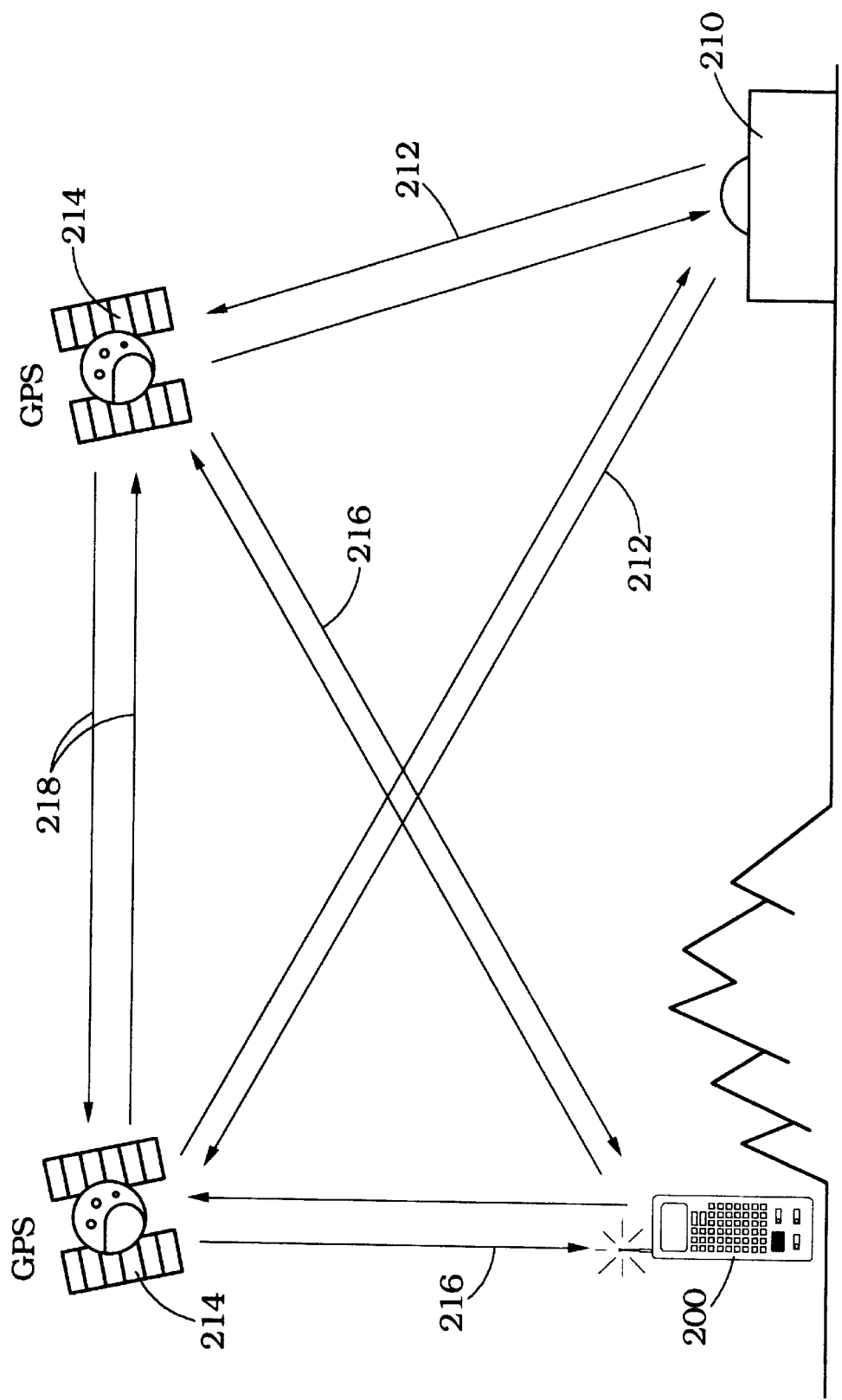
FIG. 3 is a conceptual diagram of the system of the instant invention using a GPS up/link down/link system.

Referring to FIG. 3, the relationship between the GPS system, the transceiver 200 and the broker or user transceiver 210 can be seen. To inject information into the system, the broker or the user transceiver 210 up/links by mimicking the L3 link by transmitting a signal 212 in the VHF/UHF band to the nearest satellite 214 in view. The signal 212 is an anti-jam, frequency-hopped transmission. Upon reception the satellite 214 dehops and demodulates the signal 212, reformats and remodulates and then transmits the signal 216 on the L3 link at 1381.05 MHZ. The satellite also re-transmits the signal 218 on a cross-link to other GPS satellites in order to effect global coverage. Crosslinked transmission signals 218 are downlinked on L3 as well. Although the L3 link on the GPS navigation satellite system is contemplated as the best mode for communication between the transceiver and the broker, other satellite systems are also anticipated as functioning in place of the GPS satellites 214, with the transceiver 200 suitably modified.

Accordingly, the present invention has been described with some degree of particularity directed to the preferred embodiment of the present invention. It should be appreciated though that the present invention is defined by the following claims construed in light of the prior art so that modifications or changes may be made to the preferred embodiment of the present invention without departing from the inventive concepts contained herein.

What is claimed is:

1. A remote securities based data system comprising:
   (a) a transmitter means for broadcasting continuous security related information directly to a satellite system;
   (b) a satellite system for receiving and broadcasting said information;
   (c) a portable receiver for directly receiving said information from said satellite system; and
   (d) storage means in said portable receiver for automatically and continuously storing said information as it is received, said storage means storing said information in a passive mode so that said information can be retrieved following receipt of subsequent information.

2. The remote securities based data system of claim 1, wherein said satellite system for receiving and broadcasting said information is Geosynchronous.

3. The remote securities based data system of claim 2, wherein said satellite system for receiving and broadcasting said information is a GPS system.

4. The remote securities based data system of claim 1, wherein said portable receiver is a transceiver for transmitting encrypted security buy and sell orders.

5. The remote securities based data system of claim 1, wherein said portable receiver is vehicle mounted.

6. The remote securities based data system of claim 1, wherein said portable receiver is hand held.

7. The remote securities based data system of claim 1, wherein said portable receiver contains coded alarm means which can be set for triggering upon the happening of coded received events.

8. The remote securities based data system of claim 1, wherein said security related information is commodity information.

9. The remote securities based data system of claim 1, wherein said receiver contains function keys which can be programed to perform specified functions.

10. A remote securities based data system comprising:
    (a) a base transceiver means for broadcasting and receiving continuous security related information to a satellite system;
    (b) a portable transceiver means, capable of receiving securities information and transmitting buy and sell requests, wherein said portable transceiver means contains a storage means for automatically and continually storing said transmitted information as it is received, said storage means storing said information in a passive mode so that said information can be retrieved following receipt of subsequent information;
    (c) an interactive satellite communications system which continuously links the portable transceiver means to said base transceiver means for transferring securities information and encrypted buy and sell requests between said portable transceiver means and base transceiver means.

11. The remote securities based data system of claim 10, wherein said satellite system for receiving and broadcasting said information is Geosynchronous.

12. The remote securities based data system of claim 11, wherein said satellite system for receiving and broadcasting said information is a GPS system.

13. The remote securities based data system of claim 10, wherein said portable transceiver is vehicle mounted.

14. The remote securities based data system of claim 10, wherein said portable transceiver is hand held.

15. The remote securities based data system of claim 10, wherein said portable transceiver contains coded alarm means which can bet for triggering upon the happening of coded received events.

16. The remote securities based data system of claim 10, wherein said security related information is commodity information.

17. The remote securities based data system of claim 10, wherein said transceiver contains function keys which can be programed to perform specified function.

* * * * *